J. LAUGHLIN & P. A. ELSETH.
RAILWAY CAR TRUCK.
APPLICATION FILED NOV. 19, 1915.
1,241,638.
Patented Oct. 2, 1917.
3 SHEETS—SHEET 1.
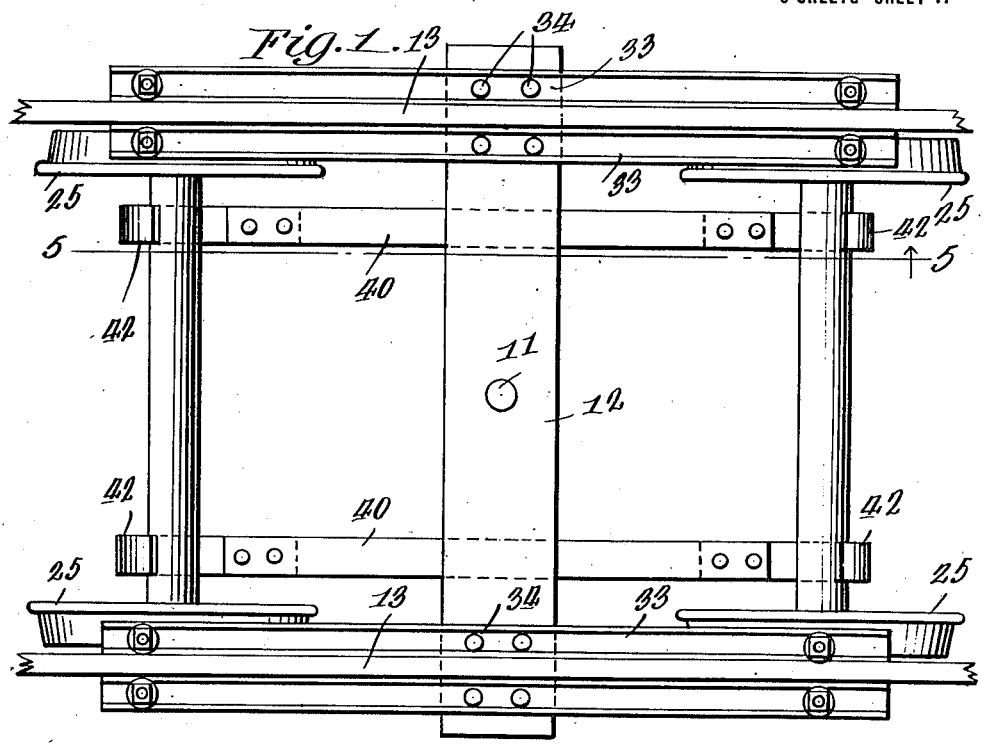
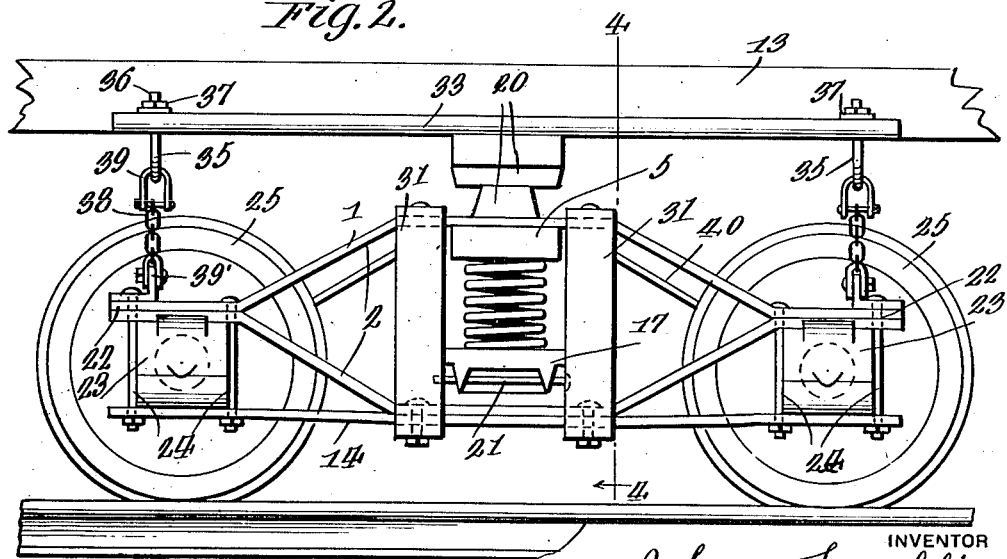
WITNESSES
INVENTOR
John Laughlin
Peter A. Elseth
BY
ATTORNEY

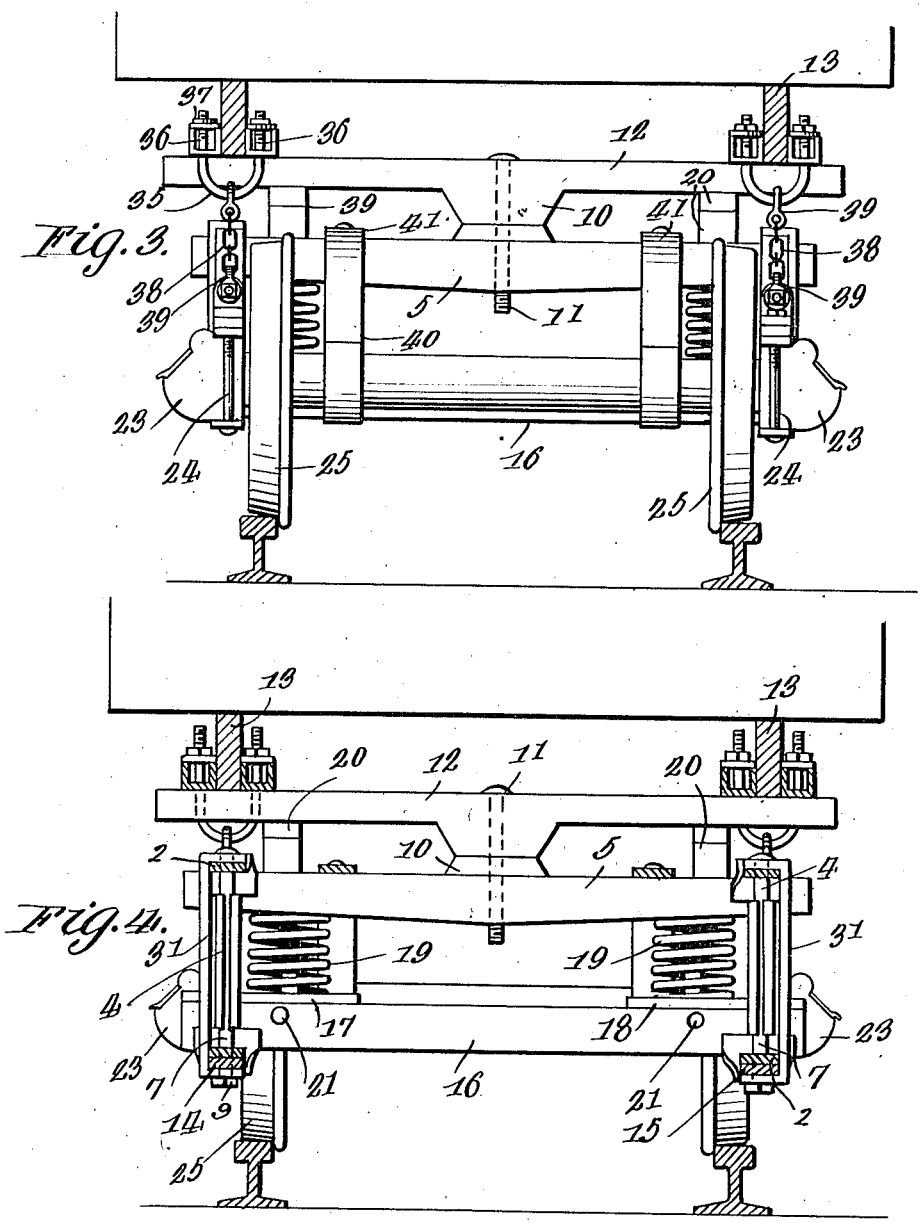

J. LAUGHLIN & P. A. ELSETH.
RAILWAY CAR TRUCK.
APPLICATION FILED NOV. 19, 1915.
1,241,638.
Patented Oct. 2, 1917.
3 SHEETS—SHEET 3.
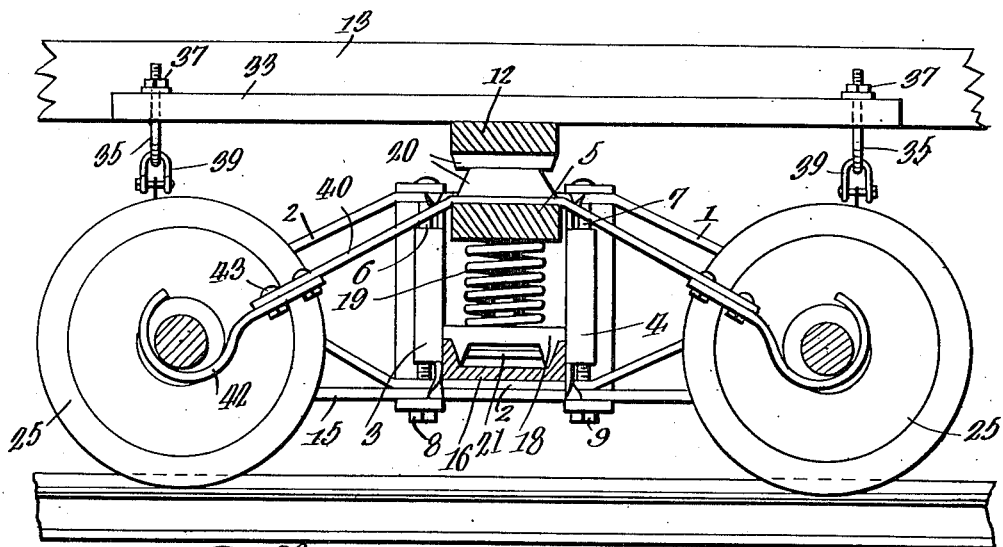
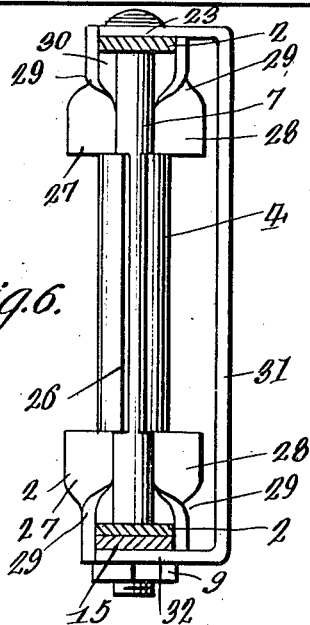
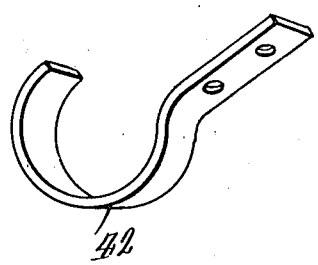
WITNESSES
Guy M. Spring
INVENTOR
John Laughlin
Peter A. Elseth.
BY Richard Bowen
ATTORNEY

UNITED STATES PATENT OFFICE.

JOHN LAUGHLIN AND PETER A. ELSETH, OF CROOKSTON, MINNESOTA.

RAILWAY-CAR TRUCK.

1,241,638.   Specification of Letters Patent.   Patented Oct. 2, 1917.

Application filed November 19, 1915. Serial No. 62,351.

*To all whom it may concern:*

Be it known that we, JOHN LAUGHLIN and PETER A. ELSETH, citizens of the United States, residing at Crookston, in the county of Polk and State of Minnesota, have invented certain new and useful Improvements in Railway-Car Trucks, of which the following is a specification.

Our invention relates to improvements in railway car trucks and more particularly to improved means supporting the ends of a swivel truck when a journal box fails.

The primary object of our invention is to provide means carried by the car body having flexible engagement with the ends of a swivel truck whereby when a journal box brass breaks the weight of the truck will be imposed upon said means, preventing the truck frame from dropping onto the road-bed which often causes derailments.

Another object of our invention is to provide means for maintaining the wheels of the truck in alinement when a journal box breaks or is otherwise rendered useless, in order to insure said wheels keeping the rails.

A still further object of our invention is to provide a safety clamp for retaining the pedestal strap and bottom arch bar of the usual "diamond" truss truck intact should the retaining bolts or the like used in such devices become accidentally loosened or lost. This also serves to support the spring plank of the truck preventing the same from dropping on the road-bed and causing derailment.

With the above and other objects in view our invention resides preferably in the construction, combination and arrangement of parts as hereinafter set forth in the specification and illustrated in the accompanying drawings in which, Figure 1 is a top plan view of a railway car truck embodying the improvements of our invention, part of the underframing and body bolster of a car being shown.

Fig. 2 is a side elevational view of a railway car truck embodying the improvements of our invention, showing a portion of the under-frame and body bolster of a car.

Fig. 3 is an end elevational view of the same.

Fig. 4 is a vertical sectional view taken on the line 4—4 of Fig. 2, looking in the direction of the arrow.

Fig. 5 is a longitudinal sectional view taken on the line 5—5 of Fig. 1, looking in the direction of the arrow.

Fig. 6 is a detail enlarged elevational view of one of our improved arch bar columns and safety clamps, and Fig. 7 is a detail enlarged perspective view of a portion of the means for maintaining the wheels in alinement.

Similar reference characters designate similar parts throughout the various views of the drawings.

In the drawings, we have illustrated a railway car truck having the usual truss frame 1 formed of the top and bottom arch bars 2 maintained in rigid relation by means of the pedestals or arch bar columns 3 and 4, said columns being disposed on each side of the truck bolster 5, which bolster may be of the usual construction. Bolts 6 and 7 pass through the columns 3 and 4 and are provided with the usual retaining nuts 8 and 9 on their lower extremities. There are four arch bar columns and bolts therefor on each truck of the four-wheel-type, such as is in common use with freight cars at the present time. The truck bolster 5 is provided with the usual center bearing 10 swiveling on the king-bolt 11 which extends through openings in said truck bolster and the body bolster 12. The body bolster 12 is mounted transversely of the body of the car on the longitudinal stringers or beams 13. The usual pedestal straps 14 and 15 are provided. We also provide a spring plank 16 of any desired form, said spring plank supporting the spring seats 17 and 18 on which the truck springs 19 are mounted, said springs 19 having their upper extremities supporting the truck bolster 5. The usual form of side bearings 20 are provided on the truck and body bolsters. Retaining bolts 21 pass through the spring plank 16 and through the spring seats 17 and 18 to retain the latter in position.

As is common in the diamond arch bar truck the outer extremities of the arch bars are connected, as shown at 22, and bear upon the usual form of journal boxes 23. The journal boxes 23 are disposed between the arch bars 2 and the pedestal strap 14 and suitable retaining bolts or the like 24 are provided. This structure may be modified to suit the various types of journal boxes and has no important structural relation to the present invention. The journal boxes serve to support the truck on the usual wheels 25.

We provide an improved type of arch bar column which is formed of sheet metal rolled into cylindrical cross section, as shown at 26 in Fig. 6. The opposite extremities of the arch bar columns are formed to provide parallel extending lugs 27 and 28, said lugs being twisted, as at 29, intermediate their lengths thereby permitting the top and bottom arch bars 2 and pedestal strap 15 to be rigidly received therebetween. The portion of the column between the outer extremities of the lugs 27 bears upon the top and bottom arch bars 2, as indicated at 30. We have provided an improved safety clamp or brace 31 having the opposite extremities bent at substantially right angles, as indicated at 32, and adapted to engage the retaining bolt 7. The portions 32 of said clamp embrace the pedestal strap and top and bottom arch bars so that should the pedestal or column 4 break or otherwise become useless the clamp 31 will serve to support the parts and prevent derailment.

Our improved means for supporting the free ends of the truck in case of journal box failure or similar accident includes a plurality of longitudinally disposed parallel arranged channel irons 33, said channel irons being arranged in pairs on each side of the longitudinal stringers 13 of the under-framing of the car body. Of course, it will be understood that in the various types of railway cars the stringers 13 are arranged at different points, sometimes not conveniently over the center line of the side frames of the truck, such as are shown. In this instance, a single channel iron may be provided of suitable strength and weight to withstand the strain which may be imposed upon it in case of accident. The channel irons 33 are bolted or otherwise secured, as indicated at 34 to the outer extremities of the body bolster 12. U-shaped bolts 35 are provided adjacent the free extremities of the channel irons 33, said U-shaped bolts having their free extremities 36 in engagement with said channel irons, suitable retaining nuts 37 being arranged on the ends of said bolts. In the form of the invention shown there are four of such bolts, one above each corner of the truck. The U-shaped bolts 35 are connected with the trucks adjacent the journal boxes by means of flexible elements such as chains 38, said chains having engagement with angle pieces 39' bolted on the top arch bar of the truck, a suitable flexible connecting means 39, preferably a clevis, being provided.

It will be understood that the length of the chain 38 is such as to allow free turning of the truck when rounding curves, but support the free ends of the truck in case the journal boxes break or are otherwise rendered useless, thereby preventing the truck ends from dropping onto the road-bed causing a derailment.

We have provided means for keeping the wheels 25 in alinement when a journal box or the like is rendered useless, this means including a plurality of straps 40 bolted to the truck bolster, as indicated at 41, and extending forwardly and rearwardly thereof and downwardly. The free extremities of the straps 40 are provided with hooks or looped portions 42 detachably secured to the straps by means of bolts 43 or the like. The loops 42 are normally beneath the axles of the wheels 25 and out of contact therewith. However, when the wheels become disengaged from the truck the hooks 42 serve to retain the wheels under the truck frame and in alinement on the rails, thereby preventing the wheels from leaving the rails.

It will be seen that when the devices of our invention are applied to a railway car truck of the usual type that all derailments owing to the structural faults of the truck or trucks are practically impossible of occurrence, and while the invention has been shown as applied to a truck of the diamond arch bar type yet this does not preclude its use in connection with trucks of other designs, such as the pressed steel truck now in common use on freight cars, and the six-wheel bogie truck in use on passenger coaches. It will also be understood that the arrangement of the safety apparatus embodying the improvements of my invention does not in any way interfere with the brake rigging now in use, sufficient room being allowed to brace the brake beams, brake rods and similar mechanism.

From the above description taken in connection with the accompanying drawings it is thought that a clear and comprehensive understanding of the construction, operation and advantages of our invention may be readily gathered, and while we have shown and described the same as embodying a specific structure we desire that it be understood that we may make such changes therein which do not depart from the spirit and scope of the invention as claimed.

We claim:—

1. The combination with a railway car and a truck therefor, of longitudinally disposed parallel arranged securing bars affixed to the car, and suspending means swiveled to the opposite ends of said securing bar for supporting the truck independently of the journal boxes.

2. The combination with a railway car and a truck therefor, of longitudinal parallel arranged bars secured to the car, and flexible connections loosely engaged with the opposite ends of said bars for supporting the truck independently of the journal boxes.

3. The combination with a railway car and a truck therefor, of pairs of longitudinally disposed parallel arranged bars secured to the car, U-shaped brackets engaged with the opposite ends of said bars, and flexible connections secured to said brackets for supporting the truck independently of the journal boxes.

4. The combination with a railway car body and a swivel truck therefor, of means for supporting the side frames of said truck independently of the journal boxes, and means for preventing disengagement of the arch bars of said side frames.

5. A column for arch bar trucks, comprising a tubular member having lugs on its opposite extremities adapted to receive and engage the top and bottom arch bars and pedestal strap of said truck.

6. A railway car truck comprising side frames, a truck bolster, a body bolster, means for supporting said side frames independently of the journal boxes, means to prevent dislodgment of the parts of said side frames, and means for maintaining the wheels of said truck in alinement when a journal box fails.

7. The combination with a railway car and a truck having a bolster and journal boxes with axles bearing therein, of pairs of longitudinally parallel arranged bars secured to the car, suspending means loosely connected to the opposite ends of said bars for supporting the truck independently of the journal boxes, longitudinal straps supported by the truck bolster, and hook members detachably secured to the ends of said straps and engageable with the axles for maintaining the same in alinement upon failure of a journal box.

In testimony whereof we affix our signatures in presence of two witnesses.

JOHN LAUGHLIN.
PETER A. ELSETH.

Witnesses:
EDWARD LARSON,
WM. LAUGHLIN.